(12) United States Patent
Webster et al.

(10) Patent No.: US 11,372,408 B1
(45) Date of Patent: Jun. 28, 2022

(54) DYNAMIC TRAJECTORY-BASED ORIENTATION OF AUTONOMOUS MOBILE DEVICE COMPONENT

(71) Applicant: AMAZON TECHNOLOGIES, INC., Seattle, WA (US)

(72) Inventors: Roger Webster, Los Altos, CA (US); Amin Hani Atrash, Los Altos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 209 days.

(21) Appl. No.: 16/058,100

(22) Filed: Aug. 8, 2018

(51) Int. Cl.
*G05D 1/00* (2006.01)
*G05D 1/02* (2020.01)

(52) U.S. Cl.
CPC ......... *G05D 1/0094* (2013.01); *G05D 1/0212* (2013.01)

(58) Field of Classification Search
CPC .......................... G05D 1/0094; G05D 1/0212
See application file for complete search history.

(56) References Cited

U.S. PATENT DOCUMENTS

| | | | | |
|---|---|---|---|---|
| 4,769,700 A * | 9/1988 | Pryor | ................... | A01B 69/008 348/120 |
| 5,901,273 A * | 5/1999 | Tsukamoto | .......... | G05B 19/401 700/253 |
| 6,195,454 B1 * | 2/2001 | Yazawa | ............. | H05K 13/0812 382/151 |
| 2009/0025502 A1 * | 1/2009 | Nakamoto | ........... | B25J 15/0009 74/490.01 |
| 2011/0042459 A1 * | 2/2011 | Sullivan | .................... | F41G 5/06 235/407 |
| 2011/0087371 A1 * | 4/2011 | Sandberg | ............. | G05D 1/0038 700/245 |
| 2012/0245711 A1 * | 9/2012 | Park | ....................... | F16M 11/18 700/13 |
| 2013/0133510 A1 * | 5/2013 | Piazza | ....................... | F41G 3/06 89/41.05 |
| 2015/0253112 A1 * | 9/2015 | Piazza | ................ | H04N 5/23293 42/111 |
| 2016/0136817 A1 * | 5/2016 | Fouillade | ............. | B25J 11/0005 700/246 |
| 2017/0352351 A1 * | 12/2017 | Kimura | .................... | G10L 25/78 |
| 2017/0358201 A1 * | 12/2017 | Govers | ................ | G05D 1/0248 |
| 2018/0259971 A1 * | 9/2018 | Nishimura | ......... | H04N 5/23296 |
| 2019/0107837 A1 * | 4/2019 | Yun | .................. | H04N 5/232411 |

FOREIGN PATENT DOCUMENTS

WO   WO-2006081948 A1 *   8/2006   ........... G06F 1/1601

* cited by examiner

*Primary Examiner* — Hunter B Lonsberry
*Assistant Examiner* — Daniel L Greene
(74) *Attorney, Agent, or Firm* — Lindauer Law, PLLC

(57) ABSTRACT

A robot has a component that is oriented relative to a chassis of the robot. For example, a display screen is mounted to the robot using a pan and tilt arrangement. During operation, trajectory data indicative of a trajectory is determined that specifies where the robot is intended to travel as it moves through an environment. This trajectory data is used to dynamically orient the component. For example, as the robot moves through the environment, the display screen would be oriented such that it appears to be "facing" a point in space that is associated with a point on the trajectory.

20 Claims, 9 Drawing Sheets

DYNAMIC TRAJECTORY-BASED ORIENTATION OF AUTONOMOUS MOBILE DEVICE COMPONENT

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
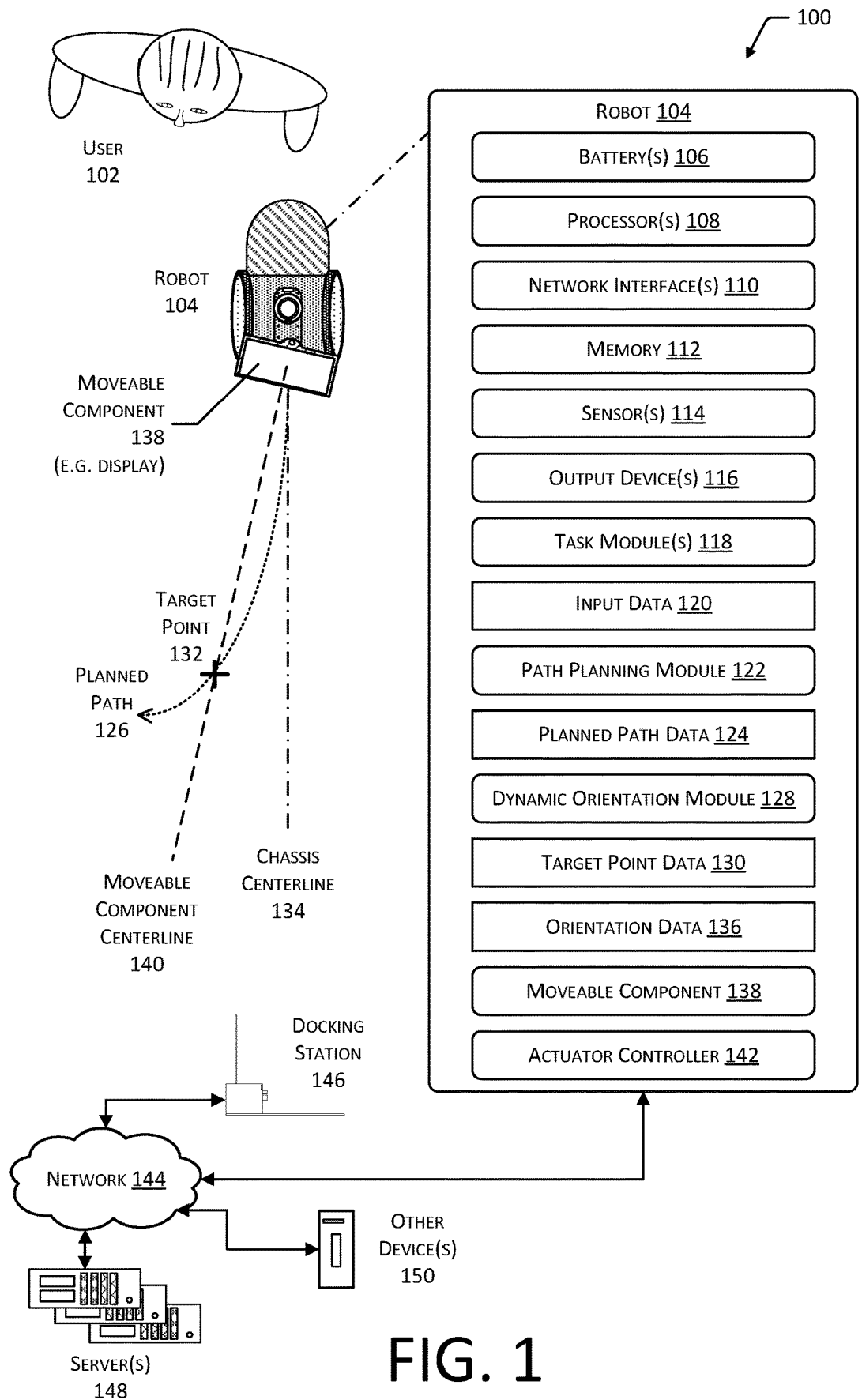
FIG. 1 illustrates a system that includes a robot which is able to dynamically orient a moveable component such as a display screen, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, a robotic assistant (robot) may perform various tasks. The robot is capable of autonomous movement, allowing it to move from one location in the home to another without being "driven" or remotely controlled by the user or other human. Some of the tasks the robot performs may involve the robot moving about an environment. For example, the user may request that the robot moves to follow the user into a different room. In another example, the robot may perform a sentry task that involves the robot moving through various rooms.

The robot utilizes a path planning module to determine a planned path through the environment. For example, if the robot is to move from one side of a room to another, the path planning module determines planned path data that represents a planned path where the robot is to move. The planned path may avoid existing obstacles, preferentially avoid or utilize particular areas, and so forth. In some implementations, the planned path data may be based on a scoring of many possible paths. A highest scoring path may be selected and used to determine the planned path data. The planned path is expected to be followed by the robot, but does not have to be. For example, if an obstacle appears along the planned path, the robot would determine a new planned path, moving around the obstacle and eventually towards the desired destination.

The path planning module may generate planned path data at particular time intervals, or based on sensor data. For example, the path planning module may generate new planned path data every 200 milliseconds (ms) or whenever an obstacle along the current planned path has been detected.

The robot includes one or more moveable components. The moveable component may be moved with respect to a chassis of the robot with respect to one or more axes. For example, the moveable component may comprise a display screen. One or more actuators may be used to move the display screen with respect to the chassis. Continuing the example, the display screen may be one or more of panned, tilted, or rotated.

Described in this disclosure are systems and techniques that provide for a dynamic trajectory-based orientation of a moveable component on an autonomous mobile device, such as a robot. In one implementation, the planned path data is processed to determine a target point. For example, the target point may be a point along the planned path where the robot is expected to be at some time interval from the present. Continuing the example, the target point may be a point along the planned path where the robot is expected to arrive 2 seconds from now.

Information about the target point is used to determine orientation data. The orientation data may then be used to operate an actuator controller and change the orientation of the moveable component. For example, a relative bearing of the target point with respect to a chassis centerline of the robot may be determined. This relative bearing may indicate an angle, relative to the chassis centerline, to the target point, such as the target point being +25 degrees relative to the chassis centerline.

The relative bearing and other data, such as a maximum panning angle of the moveable component, may be used to determine the orientation data. For example, if the relative bearing is less than or equal to the maximum panning angle, the moveable component may be oriented to the relative bearing. However, if the relative bearing is greater than the maximum panning angle, the moveable component may be oriented to the maximum panning angle closest to the relative bearing. As a result, the moveable component may be panned to "face" the target point but avoids trying to exceed the maximum rotation that is possible. The orientation data may comprise information that is indicative of the rotation to be performed. Continuing the example, the orientation data may indicate a rotation of +25 degrees.

As described above, the planned path may be updated during operation of the robot. For example, every 200 ms another planned path may be determined. Subsequently, a target point for each planned path and corresponding orientation data may be determined. This orientation data may then be provided to the actuator controller. Over time, as a result of subsequent target points being determined, the moveable component continues to track or follow a time series of target points.

By using the system and techniques described in this disclosure, an improved user interface is provided that enables safer and faster interactions between the robot and the user. Continuing the example above, the dynamic orientation of the display screen provides a visual cue to users in the immediate area as to the intended direction of the robot. Such cueing allows users to more easily avoid the path of the robot. The resulting behavior also provides a more organic or natural aspect to the behavior of the robot. As a result, the robot may be perceived as being less intrusive and more companionable.

In implementations where the moveable component comprises one or more sensors, the dynamic orientation of the moveable component may improve sensor performance and the usefulness of the resulting sensor data. For example, if the moveable component comprises a pair of stereo cameras used for the autonomous navigation, by orienting these cameras to a point along the path, the robot may be able to acquire higher resolution distance data about objects that may be present.

Illustrative System

FIG. 1 illustrates a system 100 in which a user 102 uses a robot 104 that is able to dynamically orient a moveable component 138, according to some implementations. The robot 104 may include a battery(s) 106 to provide electrical power for operation of the robot 104. The battery 106 may be rechargeable, allowing it to store electrical energy obtained from an external source. In other implementations a wireless power receiver may be used to provide power for operation of the robot 104, recharge the battery 106, and so forth. The robot 104 may include a hardware processor(s) 108 (processors), a network interface(s) 110, a memory(s) 112, sensors 114, and output devices 116. These devices are discussed in more detail with regard to FIGS. 2 and 3.

One or more task modules 118 may be stored in the memory 112. The task modules 118 may comprise instructions that, when executed by the processor 108 perform a task. For example, a sentry task module 118 may be used to have the robot 104 travel throughout the home and report to the user 102 as to the presence of an unauthorized person.

During operation, the robot 104 may determine input data 120. The input data 120 may include sensor data from the sensors 114 onboard the robot 104. For example, the input data 120 may comprise a verbal command provided by the user 102 and detected by a microphone on the robot 104.

In some situations, the task performed by the robot 104 may include moving the robot 104 within the environment. For example, the robot 104 may be directed to find the user 102 within the home. A path planning module 122 is used to determine at least a portion of a route that the robot 104 is to take during performance of the task. The path planning module 122 may be configured to determine planned path data 124 that is indicative of a particular path that the robot 104 is expected to follow. In some implementations the path planning module 122 may be part of, or used in conjunction with, an autonomous navigation module. For example, the autonomous navigation module may determine a current location of the robot 104 and determine an overall course that the robot 104 is to follow to perform the task, while the path planning module 122 handles a portion of that course that is proximate to the robot 104. Continuing the example, the path planning module 122 may be used to determine a course from the robot's 104 current location to a first waypoint elsewhere in the room that was determined by the autonomous navigation module.

The planned path 126 is representative of where the robot 104 is expected to go, and may differ from an actual path followed by the robot 104. For example, appearance of an obstacle along the planned path 126 may result in the robot 104 determining a new planned path 126 around the obstacle.

The path planning module 122 may determine planned path data 124 at specified intervals, upon receipt of data indicative of a change, and so forth. For example, the path planning module 122 may determine planned path data 124 at a specified interval, such as every 200 ms, or every meter. Appearance of an obstacle may result in determination of planned path data 124 outside of the specified interval.

In some implementations the path planning module 122 may generate a plurality of possible paths, and then score or rank those paths. A highest scoring path, deemed to be most suitable, may then be selected and used as the planned path data 124.

The planned path data 124 may be subsequently used to direct the movement of the robot 104. For example, the planned path data 124 may comprise a series of control instructions that are configured to be processed by a motor controller. These control instructions may comprise data indicative of a rotation rate of one or more motors, a duration of rotation, a total number of rotations of the one or more motors, and so forth. For example, the control instructions may instruct the motor controller to operate a first motor on a left side of the robot 104 at a rate of 10.0 radians per second (rad/s) for 5 seconds and a second motor on a right side of the robot 104 at a rate of 9.7 rad/s for 5 seconds.

The planned path data 124 may comprise other data. In one implementation, the planned path data 124 may be a vector indicative of a direction and distance, expressed relative to the chassis of the robot 104. For example, the planned path data 124 may comprise a vector value indicative of a direction and a distance, such as +12 degrees and 1.72 meters. In another implementation the planned path data 124 may comprise one or more waypoints that describe a location through or past which the robot 104 is to move. In yet another implementation the planned path data 124 may comprise a trajectory. For example, a set of coefficients may be used as inputs to an equation that describes a path along a plane or in space.

The motor controller may use the planned path data 124 to operate the motors of the robot 104 such that the robot 104 moves along the planned path 126. Continuing the example above, the motor controller may execute the instructions, resulting in the motors moving the robot 104.

A dynamic orientation module 128 may use the planned path data 124 to determine target point data 130 that is indicative of a particular target point 132. The target point data 130 may be indicative of a location in space of the target point 132 with respect to the robot 104 or an external coordinate system. The target point 132 may indicate a point along, or proximate to, the planned path 126. The target point 132 may be determined based on one or more of time, distance, characteristics of the planned path 126, presence of obstacles, and so forth.

In one implementation, the target point 132 may correspond to a location along the planned path 126 where the autonomous mobile device is expected to be at a first time interval from a current time. For example, the target point 132 may be where the robot 104 expects to have moved to two seconds from now. The first time interval may be between 750 ms and 5 seconds. The length of the first time interval may be dynamically adjusted. For example, the first time interval may vary by the task being performed, speed of the robot, and so forth.

In another implementation, the target point 132 may correspond to a location that is a specified distance along the planned path 126. For example, the target point 132 may comprise a point that is 1.7 meters along the planned path 126. The distance may be dynamically adjusted. For example, the distance may vary by the task being performed, speed of the robot, and so forth.

In still another implementation, the target point 132 may correspond to a location of a turn in the planned path 126 that exceeds a threshold value. For example, if the planned path 126 includes a turn that results in the robot 104 turning 90 degrees to the right to go around a corner with a radius of curvature that is less than a threshold radius value, the target point 132 may comprise a point that is at a midpoint of the curve in the planned path 126. In some implementations the threshold may be expressed as a radius of curvature, number of degrees of change in heading of the robot 104 per distance travelled, and so forth. In some implementations, the target point 132 may comprise a point on the turn where the turn begins, such as a starting point of a turning arc where the planned path 126 transitions from having a first radius of curvature that is greater than a first threshold value to having a second radius of curvature that is less than a second threshold value. For example, the starting point of a turning arc may be where the planned path 126 transitions from a straight line to a curve. In other implementations the target point 132 may comprise a point at the end of the turn where the turn is complete, such as an ending point of the turning arc.

The target point 132 may be determined using a plurality of intermediate points along at least a portion of the planned path 126. A line of travel may be determined based on the plurality of intermediate points along the planned path 126. For example, a linear regression may be applied to the plurality of intermediate points every 5 cm along the planned path 126, and the line of travel may comprise the line of that linear regression. The target point 132 may comprise a point along the line of travel. For example, the target point 132 may comprise a point along the line of travel that is a specified distance from the robot 104.

In still another implementation, the target point 132 may be determined based on the presence of an obstacle. For example, a location of an obstacle may be determined. The target point 132 may be a location that is within a threshold distance of the planned path 126 and is between the robot 104 and the location of the obstacle. Continuing the example, as the robot 104 approaches an obstacle and the planned path 126 directs the robot 104 around the obstacle, the target point 132 would be on the side of the obstacle that is visible to the robot 104. As a result, the dynamic orientation module 128 is selecting a target point 132 that is within line of sight of the robot 104. The dynamic orientation module 128 may limit the target point 132 to a place along the planned path 126 that is within the same room, or within a threshold distance of the same room. For example, the robot 104 may determine that it is in the kitchen. The dynamic orientation module 128 may access data indicative of the boundaries of the kitchen, and select a target point 132 that is within or at those boundaries.

While the target point 132 is described as being on or along the planned path 126, it is understood that the target point 132 may be a location that is proximate to the planned path 126. For example, the target point 132 may designate a location that is 2 cm away from the planned path 126.

The dynamic orientation module 128 may generate target point data 130 indicative of a target point 132 on an ongoing basis. For example, the target point data 130 may be updated on a specified time interval, such as every 200 ms. In some implementations the target point data 130 may be generated responsive to other data, such as sensor data indicative of an obstacle or a user command. The dynamic orientation module 128 may produce target point data 130 that describes a series of target points 132 that may change over time.

The path planning module 122 may produce planned path data 124 that varies overtime. For example, the planned path 126 at a first time may differ from the planned path 126 at a second time. As a result, the target points 132 associated with these different planned paths 126 may be in different locations. To minimize or eliminate abrupt changes in the target point 132 from time to time, the target point data 130 may be filtered or otherwise processed. In one implementation, the target point data 130 may indicate a target point 132 in space that is a moving average of a plurality of target points 132, each associated with a different planned path 126 that was generated at different times. For example, the planned path 126 may be updated every 200 ms, resulting in five target points 132 generated per second. A moving average of the location of those five target points 132 may be calculated and the resulting location used as the target point 132 and indicated by the target point data 130. In other implementations, other techniques may be used.

In yet another implementation, the dynamic orientation module 128 may incorporate a hysteresis function to determine the orientation data 136. As a result, the dynamic orientation module 128 may introduce a dynamic lag.

The dynamic orientation module 128 may use the target point data 130 and other data obtained from the planned path data 124 to generate orientation data 136. The orientation data 136 may then be used to cause a moveable component 138 to change orientation with respect to one or more axes by directing the operation of an actuator controller 142. The moveable component 138 has a moveable component centerline 140. In other implementations, another reference line may be used.

The change in orientation of the moveable component 138 causes a change in the moveable component centerline 140. The orientation data 136 may comprise command instructions that direct the actuator controller 142 to drive an actuator that produces a desired change in orientation of the moveable component 138.

As shown in FIG. 1, the robot 104 may have a chassis centerline 134. The chassis centerline 134 designates a line that extends fore and aft of the robot 104 along a center of a chassis of the robot 104. In other implementations, another reference line may be used.

The orientation data 136 may be determined based on the target point data 130 and other information, such as predicted velocity of the robot 104 along the planned path 126, radius of curvature of the planned path 126, a maximum panning angle that the moveable component 138 is able to attain, and so forth. The orientation data 136 may specify angles of rotation of the moveable component 138 along one or more axes.

In another implementation, the dynamic orientation module 128 may introduce a limitation on a maximum motion of the moveable component 138 per unit time. For example, the dynamic orientation module 128 may limit the rate of angular change per unit time of panning such that the moveable component 138 moves from one target point 132 to another relatively slowly. In yet another implementation, the dynamic orientation module 128 may be configured to disregard some target points 132. For example, the dynamic orientation module 128 may be configured to generate orientation data 136 based on every nth target point 132, where n is a non-zero positive integer.

In one implementation, a relative bearing to the target point 132 may be determined. The relative bearing indicates an angle, such as with respect to the chassis centerline 134, of a line extending from a point on the robot 104 to the target point 132. If the relative bearing indicates an angle that is less than the maximum panning angle, the orientation data 136 may be indicative of an angle of rotation for the moveable component 138 that equals the relative bearing. If the relative bearing is outside the maximum panning angle, the orientation data 136 may be indicative of the maximum panning angle. A moveable component angle comprises an angle between the chassis centerline 134 and the moveable component centerline 140. The various angles are discussed in more detail below with regard to FIGS. 5 and 6.

The moveable component 138 may comprise one or more devices that may be moved as one. The moveable component 138 may comprise one or more of sensors 114, output devices 116, or inactive elements such as a shell or pointer. For example, the moveable component 138 may comprise a frame that supports a display screen, one or more cameras, one or more microphones, one or more speakers, a laser, and so forth. In another example, the moveable component 138 may comprise an inactive element, such as a stylized model of a head. While the robot 104 is depicted with a single moveable component 138, in other implementations the robot 104 may include more than one moveable component 138.

The moveable component 138 is mounted such that is it able to be moved with respect to a chassis of the robot 104. For example, the moveable component 138 may be mounted such that it may move along one or more degrees of freedom, such as allowing a pan left and right, tilt up and down, or rotate along an axis that is perpendicular to a surface of the display. The moveable component 138 may be moved with respect to the chassis by way of one or more moveable component actuators that are driven by an actuator controller 142. The moveable component actuators may comprise linear actuators, rotary motors, pneumatic pistons, hydraulic pistons, electroactive polymers, shape memory metals, and so forth.

The moveable component 138 may be tilted based on a predicted velocity of the robot 104 along the planned path 126. For example, as the predicted velocity increases, the moveable component 138 is tilted upwards. Continuing the example, as the velocity decreases, the moveable component 138 is tilted downwards. The angular displacement may be proportionate to the predicted velocity. This provides the user 102 with a cue as to how fast the robot 104 is expected to be traveling. The relationship between the angular displacement, or tilt and the predicted velocity may be represented as a mathematical function, lookup table, and so forth. In some implementations, the tilt of the moveable component 138 may be determined based at least in part on the actual velocity of the robot 104.

The moveable component 138 may be rotated, such as along an axis that is perpendicular to a plane of the display in the moveable component 138. The rotation may be responsive to a radius of curvature of at least a portion of the planned path 126. In some implementations the rotation may also be based at least in part on a direction of that curvature, such as left or right relative to the robot 104. For example, if the planned path 126 exhibits a curve to the right with a radius of curvature that is less than a threshold value, the moveable component 138 may be rotated such that a rightmost portion of the moveable component 138 is closer to the ground while a leftmost portion of the moveable component 138 is farther away from the ground. With this rotation, the robot 104 may give the appearance of "leaning" into a turn. This provides the user 102 with a cue as to how quickly the robot 104 is expecting to turn. The relationship between the angle of rotation and the radius of curvature may be represented as a mathematical function, lookup table, and so forth. In some implementations the magnitude of the rotation may also be based at least in part on the predicted velocity.

In one implementation the actuator controller 142 may receive as input the orientation data 136. For example, orientation data 136 may indicate a value of a pan of "+15 degrees", a tilt of "+20 degrees", and a rotation of "−5 degrees". The actuator controller 142 receives the orientation data 136 and generates one or more drive signals to the moveable component actuator that moves the moveable component 138 with respect to the chassis of the robot 104. Motion of the moveable component 138 may thus be independent of the direction that the robot 104 is travelling at any given moment in time. For example, the planned path 126 may include a portion that is straight and then curves to the right. If the target point 132 is located in the curved section of the planned path 126, the robot 104 would initially be moving straight ahead, with the moveable component centerline 140 being pointed to the right of the chassis centerline 134.

By utilizing the dynamic orientation module 128 to determine the target point data 130 and orientation data 136, the actuator controller 142 is able to direct the moveable component 138 to maintain a specified orientation or spatial relationship with respect to the target point 132. Continuing the earlier example, if the moveable component 138 comprises a display device and one or more cameras, and the moveable component centerline 140 comprises a line that extends perpendicular to a horizontal line across the display, as the robot 104 moves the display appears to "face" the target point 132. This arrangement of the moveable component 138 provides a visible cue to a bystander, such as the user 102 or another robot 104, as to the planned path 126. As a result, these bystanders may be better able to coexist with the robot 104. For example, a user 102 who observes this behavior is better able to, and without necessarily conscious thought, ascertain the direction of the robot 104 and adjust their own path to avoid a potential conflict. Additionally, changes in the tilt angle of the moveable component 138 provide cues to the bystanders about the robot's 104 expected velocity, while the rotation angle of the moveable component 138 provides cues to the bystanders about how fast the robot 104 is expected to turn. These cues provide an improved user interface for the user 102 to interact and operate contemporaneously with the robot 104. The cueing also provides improved safety as the user 102 is able to ascertain the planned path 126, or at least a portion thereof, and is better able to avoid colliding with the robot 104.

The robot 104 may use the network interfaces 110 to connect to a network 144. For example, the network 144 may comprise a wireless local area network, that in turn is connected to a wide area network such as the Internet.

The robot 104 may be configured to dock or connect to a docking station 146. The docking station 146 may also be connected to the network 144. For example, the docking station 146 may be configured to connect to the wireless local area network such that the docking station 146 and the robot 104 may communicate. The docking station 146 may provide external power which the robot 104 may use to charge the battery 106.

The robot 104 may access one or more servers 148 via the network 144. For example, the robot 104 may utilize a wake word detection module to determine if the user 102 is addressing a request to the robot 104. The wake word detection module may hear a specified word or phrase and transition the robot 104 or portion thereof to the wake operating mode. Once in the wake mode, the robot 104 may then transfer at least a portion of the audio spoken by the user 102 to one or more servers 148 for further processing. The servers 148 may process the spoken audio and return to the robot 104 data that may be subsequently used to operate the robot 104.

The robot 104 may also communicate with other devices 150. The other devices 150 may include home automation controls, sensors, and so forth that are within the home or associated with operation of one or more devices in the home. For example, the other devices 150 may include a doorbell camera, a garage door, a refrigerator, washing machine, a network connected microphone, and so forth. In some implementations the other devices 150 may include other robots 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 2:
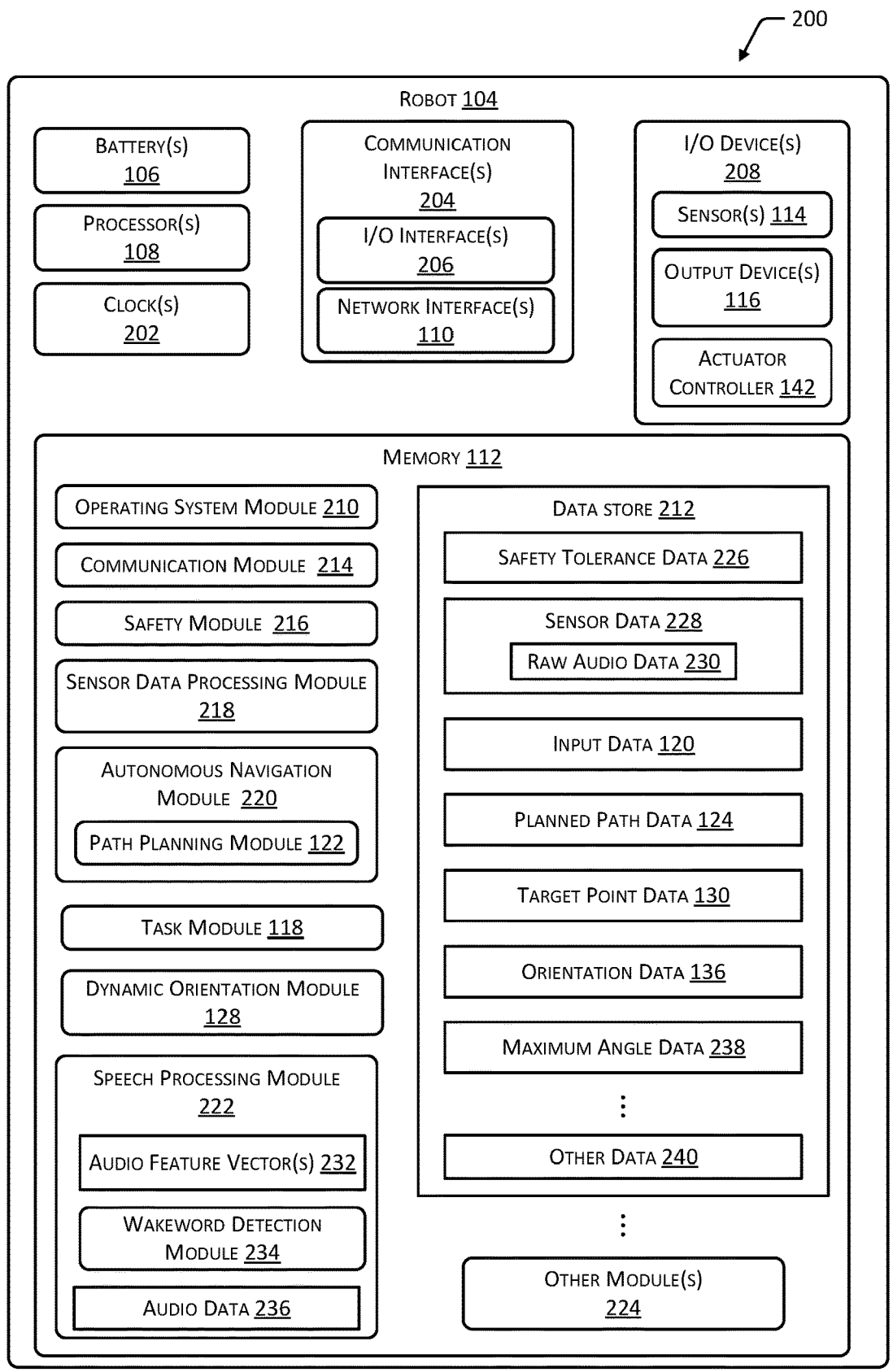
FIG. 2 is a block diagram of the components of the robot, according to some implementations.

FIG. 2 is a block diagram 200 of the robot 104, according to some implementations. The robot 104 may include one or more batteries 106 to provide electrical power suitable for operating the components in the robot 104. In some implementations other devices may be used to provide electrical power to the robot 104. For example, power may be provided by wireless power transfer, capacitors, fuel cells, storage flywheels, and so forth.

The robot 104 may include one or more hardware processors 108 (processors) configured to execute one or more stored instructions. The processors 108 may comprise one or more cores. The processors 108 may include microcontrollers, systems on a chip, field programmable gate arrays, digital signals processors, graphic processing units, general processing units, and so forth. One or more clocks 202 may provide information indicative of date, time, ticks, and so forth. For example, the processor 108 may use data from the clock 202 to associate a particular interaction with a particular point in time.

The robot 104 may include one or more communication interfaces 204 such as input/output (I/O) interfaces 206, network interfaces 110, and so forth. The communication interfaces 204 enable the robot 104, or components thereof, to communicate with other devices 150 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 114, keyboard, mouse, scanner, and so forth. The I/O devices 208 may also include output devices 116 such as one or more of a motor, light, speaker, display, projector, printer, and so forth. In some embodiments, the I/O devices 208 may be physically incorporated with the robot 104 or may be externally placed.

The network interfaces 110 may be configured to provide communications between the robot 104 and other devices 150 such as other robots 104, a docking station 146, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, Wi-Fi, Bluetooth, Bluetooth Low Energy, ZigBee, and so forth.

The robot 104 may also include one or more buses or other internal communications hardware or software that allow for the transfer of data between the various modules and components of the robot 104.

As shown in FIG. 2, the robot 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the robot 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 150 including other robots 104, servers 148, network attached storage devices, and so forth.

A communication module 214 may be configured to establish communication with other devices 150, such as other robots 104, an external server 148, a docking station 146, and so forth. The communications may be authenticated, encrypted, and so forth.

Other modules within the memory 112 may include a safety module 216, a sensor data processing module 218, an autonomous navigation module 220, the one or more task modules 118, the path planning module 122, the dynamic orientation module 128, a speech processing module 222, or other modules 224. The modules may access data stored within the data store 212, such as safety tolerance data 226, sensor data 228, or other data 240.

The safety module 216 may access safety tolerance data 226 to determine within what tolerances the robot 104 may operate safely within the physical environment. For example, the safety module 216 may be configured to stop the robot 104 from moving when the extensible mast is extended. In another example, the safety tolerance data 226 may specify a minimum sound threshold which, when exceeded, stops all movement of the robot 104. Continuing this example, detection of sound such as a human yell would stop the robot 104. In another example, the safety module 216 may access safety tolerance data 226 that specifies a minimum distance from an object that the robot 104 must maintain. Continuing this example, when a sensor 114 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more the motors, and so forth. The safety module 216 may be implemented as hardware, software, or a combination thereof.

The safety module 216 may control other factors, such as a maximum speed of the robot 104 based on information obtained by the sensors 114, precision and accuracy of the sensor data 228, and so forth. For example, detection of an object by an optical sensor may include some error, such as when the distance to an object comprises a weighted average between the object and a background. As a result, the maximum speed permitted by the safety module 216 may be based on one or more factors such as the weight of the robot 104, nature of the floor, distance to the object, and so forth. In the event that the maximum permissible speed differs from the maximum speed permitted by the safety module 216, the lesser speed may be utilized.

The sensor data processing module 218 may access sensor data 228 that is acquired from one or more the sensors 114. The sensor data processing module 218 may provide various processing functions such as de-noising, filtering, change detection, and so forth. Processing of sensor data 228, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 228. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 228 or other data 240. For example, the ANN may be a trained using a supervised learning algorithm such that object identifiers are associated with images of particular objects within training images provided to the ANN. Once trained, the ANN may be provided with the sensor data 228 and produce output indicative of the object identifier.

The autonomous navigation module 220 provides the robot 104 with the ability to navigate within the physical environment without real-time human interaction. For example, the autonomous navigation module 220 may implement one or more simultaneous localization and mapping ("SLAM") techniques to determine an occupancy map or other representation of the physical environment. The SLAM algorithms may utilize one or more of maps, algorithms, beacons, or other techniques to provide navigational data. The navigational data may then be used to determine a path which is subsequently used to determine a set of commands that drive the motors connected to the wheels. For example, the autonomous navigation module 220 may access environment map data during operation to determine a relative location, estimate a path to a destination, and so forth.

The autonomous navigation module 220 may include an obstacle avoidance module. For example, if an obstacle is detected along a planned route, the obstacle avoidance module may re-route the robot 104 to move around the obstacle or take an alternate route.

The autonomous navigation module 220 may utilize various techniques during processing of sensor data 228. For example, image data obtained from cameras on the moveable component 138 may be processed to determine one or more of corners, edges, planes, and so forth. In some implementations corners may be detected and the coordinates of those corners may be used to produce point cloud data.

The occupancy map may be manually or automatically determined. Continuing the example, during the learning phase, or subsequent operation, the robot 104 may generate an occupancy map that is indicative of locations of obstacles such as chairs, doors, stairwells, and so forth.

In some implementations, the occupancy map may include floor characterization data. The floor characterization data is indicative of one or more attributes of the floor at a particular location within the physical environment. During operation of the robot 104, floor characterization data may be obtained. The floor characterization data may be utilized by one or more of safety module 216, the autonomous navigation module 220, the task module 118, or other modules 224. For example, the floor characterization data may be used to determine if an unsafe condition occurs such as a wet floor. In another example, the floor characterization data may be used by the autonomous navigation module 220 to assist in the determination of the current location of the robot 104 within the home. For example, if the autonomous navigation module 220 determines that the robot 104 is located in the dining room, but the floor characterization data indicates that the floor is consistent with the living room, an error condition may be generated in which other techniques are used to determine the location of the robot 104 or otherwise resolve the difference. For example, the robot 104 may attempt to return to the docking station 146 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 102. For example, the robot 104 may use speech synthesis to ask the user 102 "what room is this?" during a training phase. The utterance of the user 102 may be received by the microphone array and the audio data "this is the living room" may be processed and subsequently used to generate the location designator.

The autonomous navigation module 220 may be used to move the robot 104 from a first location to a second location within the physical environment. This movement may be responsive to a determination made by an onboard processor 108, in response to a command received via one or more communication interfaces 204 or a sensor 114, and so forth. For example, an external server 148 may send a command that is subsequently received using a network interface 110. This command may direct the robot 104 to proceed to a designated destination, such as "living room" or "dining room". The robot 104 may then process this command and use the autonomous navigation module 220 to determine the directions and distances associated with reaching the specified destination.

The memory 112 may store one or more task modules 118. A task module 118 comprises instructions that, when executed, provide one or more functions associated with a particular task. In one example, the task may comprise a security or watchmen task in which the robot 104 travels throughout the physical environment looking for events that exceed predetermined thresholds. Continuing the example, if the robot 104 detects that the ambient temperature is below a minimum level, or that water is present on the floor, or detects sound of broken glass, an alert may be generated. The alert may be given as an audible, visual, or electronic notification. For example, the electronic notification may involve the robot 104 transmitting data using one or more of the communication interfaces 204.

In another example, the task may comprise a "follow me" feature in which the robot 104 follows a user 102. For example, the user 102 may participate in a video call using the robot 104. The camera on the mast may be used to acquire video for transmission while the display is used to present video that is received. The robot 104 may use data from one or more sensors 114 to determine a location of the user 102 relative to the robot 104, and track and follow the user 102. In one implementation, computer vision techniques may be used to locate the user 102 within image data acquired by the cameras. In another implementation, the user's voice may be detected by an array of microphones, and a direction to the voice with respect to the robot 104 may be established. Other techniques may be utilized either alone or in combination to allow the robot 104 to track a user 102, follow a user 102, or track and follow a user 102. The path of the robot 104 as it follows the user 102 may be based at least in part on one or more of constraint cost values. For example, while the robot 104 is following the user 102 down the hallway, the robot 104 may stay to the right side of the hallway. In some situations, while following a user 102 the robot 104 may disregard some rules or may disregard the speed values for a particular area. For example, while following the user 102 the robot 104 may not slow down while passing a doorway.

In yet another example, the task may allow for the robot 104 to be summoned to a particular location. The user 102 may utter a voice command that is heard by a microphone on the robot 104, a microphone in a smart phone, or another device with a microphone such as a network enabled speaker or television. Alternatively, the user 102 may issue a command using an app on a smartphone, wearable device, tablet, or other computing device. Given that the location of the device at which the command was obtained is known, the robot 104 may be dispatched to that location. Alternatively, if the location is unknown, the robot 104 may search for the user 102.

The speech processing module 222 may be used to process utterances of the user 102. Microphones may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 144 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector 232) representing features/qualities of the raw audio data 230 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 234 to perform wakeword detection to determine when a user 102 intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data corresponding to a keyword.

Thus, the wakeword detection module 234 may compare audio data 236 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 148 for speech processing. The audio data 236 corresponding to audio obtained by the microphone may be sent to a server 148 for routing to a recipient device or may be sent to the server 148 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

The robot 104 may connect to the network 144 using one or more of the network interfaces 110. One or more servers 148 may provide various functions, such as ASR, natural language understanding (NLU), providing content such as audio or video to the robot 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input to a task module 118, and so forth. In one implementation, the text string may be sent via a network 144 to a server 148 for further processing. The robot 104 may receive a response from the server 148 and present output, perform an action, and so forth. For example, the raw audio data 230 may include the user 102 saying, "robot go to the dining room". The audio data 236 representative of this utterance may be sent to the server 148 that return commands directing the robot 104 to the dining room of the home associated with the robot 104.

The utterance may result in a response from the server 148 that directs operation of other devices 150 or services. For example, the user 102 may say, "robot wake me at seven tomorrow morning". The audio data 236 may be sent to the server 148 that determines the intent and generates commands to instruct a device attached to the network 144 to play an alarm at 7:00 am the next day.

The other modules 224 may comprise a speech synthesis module that is able to convert text data to human speech. For example, the speech synthesis module may be used by the robot 104 to provide speech that a user 102 is able to understand.

Maximum angle data 238 may also be stored in the data store 212. The maximum angle data 238 may indicate the maximum amount of rotation that the moveable component 138 is permitted with respect to one more axes. For example, the maximum angle data 238 may indicate that the moveable component 138 may be panned a maximum of 45 degrees to either side of the chassis centerline 134, tilted a maximum of 30 degrees up or down, or rotated a maximum of 30 degrees clockwise or counterclockwise.

The data store 212 may store other data 240 such as user preference data. For example, the user preference data may be used when a particular user identifier is using the robot 104.

Figure 3:
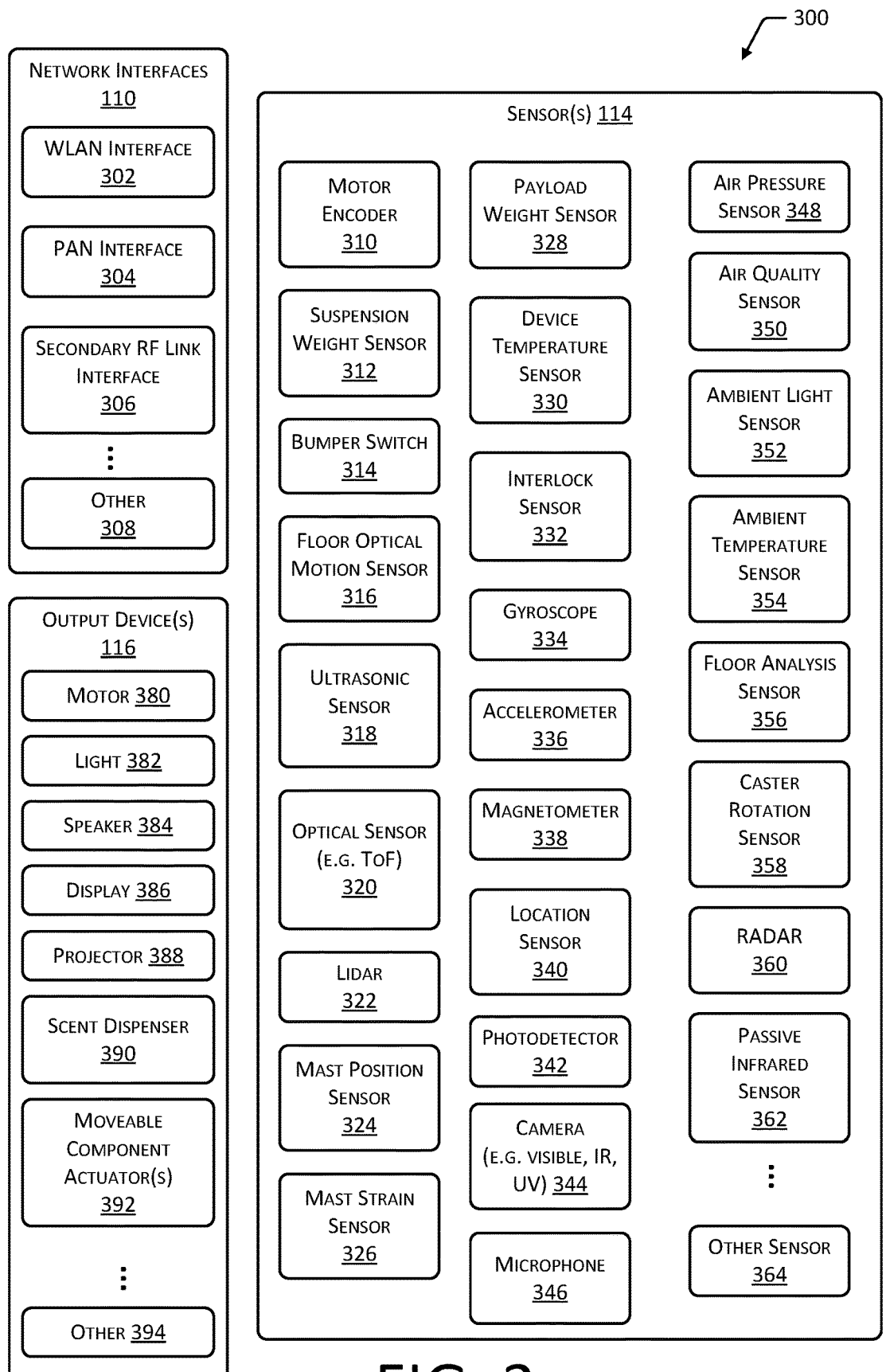
FIG. 3 is a block diagram of some components of the robot such as network interfaces, sensors, and output devices, according to some implementations.

FIG. 3 is a block diagram 300 of some components of the robot 104 such as network interfaces 110, sensors 114, and output devices 116, according to some implementations. The components illustrated here are provided by way of illustration and not necessarily as a limitation. For example, the robot 104 may utilize a subset of the particular network interfaces 110, output devices 116, or sensors 114 depicted here, or may utilize components not pictured. One of more of the sensors 114, output devices 116, or a combination thereof may be included in the moveable component 138.

The network interfaces 110 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices 150 in the event that communication fails using one or more of the WLAN interface 302 or the PAN interface 304. For example, in the event the robot 104 travels to an area within the physical environment that does not have Wi-Fi coverage, the robot 104 may use the secondary RF link interface 306 to communicate with another device such as a specialized access point, docking station 146, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates via by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 114. The sensors 114 depicted here are provided by way of illustration and not necessarily as a limitation. It is understood other sensors 114 may be included or utilized by the robot 104, while some sensors 114 may be omitted in some configurations.

A motor encoder 310 provides information indicative of the rotation or linear extension of a motor. The motor may comprise a rotary motor, or a linear actuator. In some implementations, the motor encoder 310 may comprise a separate assembly such as a photodiode and encoder wheel that is affixed to the motor. In other implementations, the motor encoder 310 may comprise circuitry configured to drive the motor. For example, the autonomous navigation module 220 may utilize the data from the motor encoder 310 to estimate a distance traveled.

A suspension weight sensor 312 provides information indicative of the weight of the robot 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors. For example, if the suspension weight sensor 312 indicates no weight on the suspension, the implication is that the robot 104 is no longer resting on its wheels, and thus operation of the motors may be inhibited. In another example, if the suspension weight sensor 312 indicates weight that exceeds a threshold value, the implication is that something heavy is resting on the robot 104 and thus operation of the motors may be inhibited.

One or more bumper switches 314 provide an indication of physical contact between a bumper or other member that is in mechanical contact with the bumper switch 314. The safety module 216 may utilize sensor data 228 obtained by the bumper switches 314 to modify the operation of the robot 104. For example, if the bumper switch 314 associated with a front of the robot 104 is triggered, the safety module 216 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 utilizes sounds in excess of 20 kHz to determine a distance from the sensor 114 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 228 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 114 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 220 may utilize the sensor data 228 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 228 may be generated that is indicative of the presence of objects and the relative positions, shapes, and so forth is visible to the lidar 322. Data from the lidar 322 may be used by various modules. For example, the autonomous navigation module 220 may utilize point cloud data generated by the lidar 322 for localization of the robot 104 within the physical environment.

A mast position sensor 324 provides information indicative of a position of a mast. For example, the mast position sensor 324 may comprise limit switches associated with the mast extension mechanism that indicate whether the mast is an extended or retracted position. In other implementations, the mast position sensor 324 may comprise an optical code on at least a portion of the mast that is then interrogated by an optical emitter and a photodetector 342 to determine the distance which the mast is extended. In another implementation, the mast position sensor 324 may comprise an encoder wheel that is attached to a mast motor that is used to raise or lower the mast. The mast position sensor 324 may provide data to the safety module 216. For example, if the robot 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the robot 104. For example, the mast strain sensor 326 may comprise strain gauge or load cell that measures a side-load applied to the mast or a weight on the mast or downward pressure on the mast. The safety module 216 may utilize sensor data 228 obtained by the mast strain sensor 326. For example, if the strain applied to the mast exceeds a threshold amount, the safety module 216 may direct an audible and visible alarm to be presented by the robot 104.

A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more the batteries 106, one or more motors 380, and so forth. In the event the temperature exceeds a threshold value, the component associated with that device temperature sensor 330 may be shut down.

One or more interlock sensors 332 may provide data to the safety module 216 or other circuitry that prevents the robot 104 from operating in an unsafe condition. For example, the interlock sensors 332 may comprise switches that indicate whether an access panel is open. The interlock sensors 332 may be configured to inhibit operation of the robot 104 until the interlock switch indicates a safe condition is present.

A gyroscope 334 may provide information indicative of rotation of an object affixed thereto. For example, the gyroscope 334 may generate sensor data 228 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more locations sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 228 indicative of impinging light. For example, the photodetector 342 may provide data indicative of a color, intensity, duration, and so forth.

A camera 344 generates sensor data 228 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 228 comprising images being sent to the autonomous navigation module 220. In another example, the camera 344 may comprise a 10 megapixel or greater camera that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 220 may be acquired using a rolling shutter and subsequently may be processed to mitigate image artifacts.

One or more microphones 346 may be configured to acquire information indicative of sound present in the physical environment. In some implementations, arrays of microphones 346 may be used. These arrays may implement beamforming techniques to provide for directionality of gain. The robot 104 may use the one or more microphones 346 to acquire information from acoustic tags, accept voice input from users 102, determine ambient noise level, for voice communication with another user 102 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 220, the task module 118, and so forth. For example, if the floor analysis sensor 356 determines that the floor is wet, the safety module 216 may decrease the speed of the robot 104 and generate a notification alerting the user 102.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of a caster, and so forth. For example, the caster rotation sensor 358 may comprise an optical encoder and corresponding target that is able to determine that the caster transitioned from an angle of 0° at a first time to 49° at a second time.

The sensors 114 may include a radar 360. The radar 360 may be used to provide information as to a distance, lateral position, and so forth, to an object.

The sensors 114 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical environment to provide landmarks for the autonomous navigation module 220. One or more touch sensors may be utilized to determine contact with a user 102 or other objects.

The robot 104 may include one or more output devices 116. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on the surface, such as the floor, wall, ceiling, and so forth.

A scent dispenser 390 be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller 142 may be used to provide a signal or other input that operates one or more of the moveable component actuators 392 to produce movement of the moveable component 138.

In other implementations, other 394 output devices may be utilized. For example, the robot 104 may include a haptic output device that provides output that produces particular touch sensations to the user 102. Continuing the example, a motor 380 with an eccentric weight may be used to create a buzz or vibration to allow the robot 104 to simulate the purr of a cat.

Figure 4:
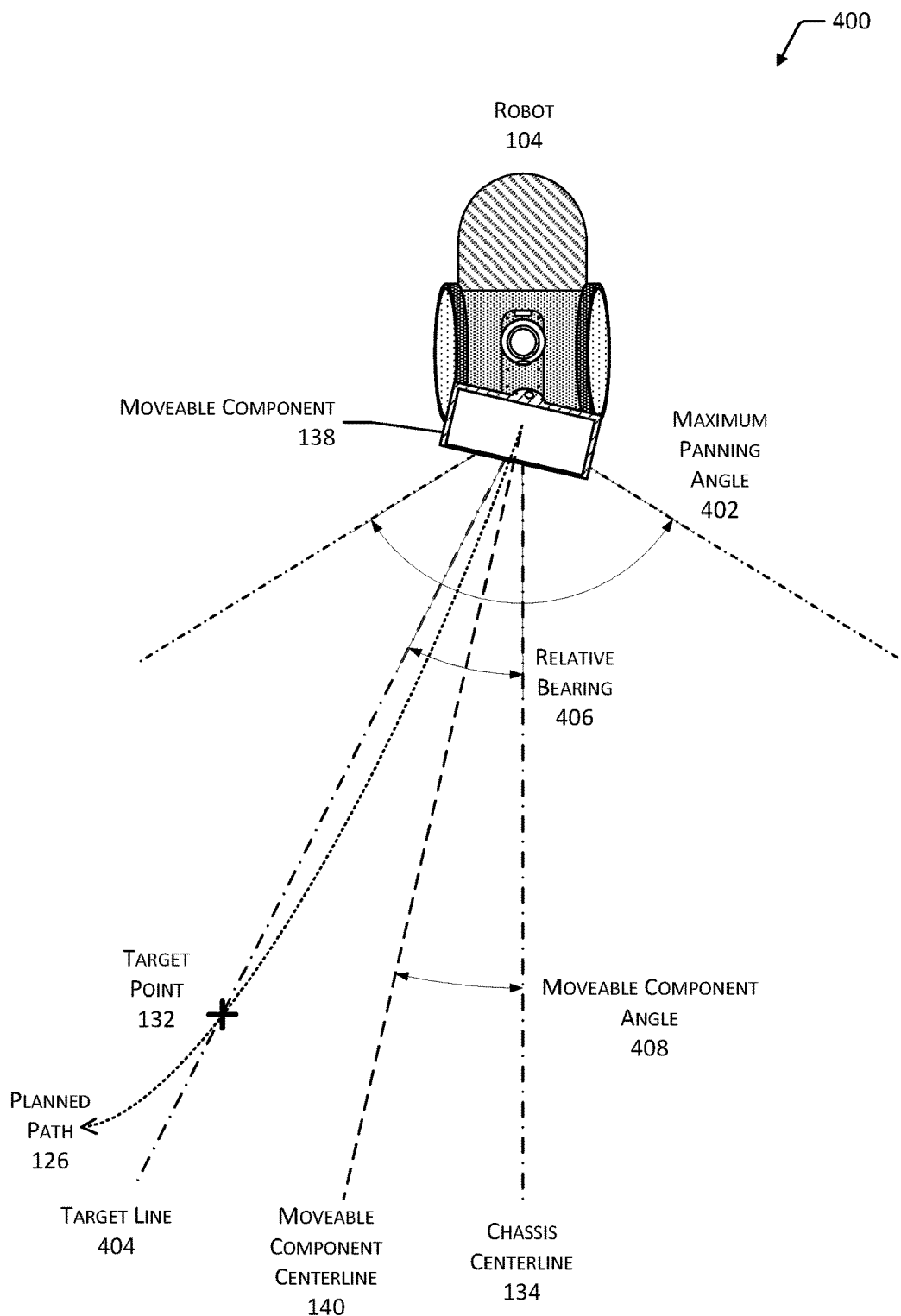
FIG. 4 illustrates a maximum panning angle of the moveable component and other angles and lines used to describe the movement of the moveable component, according to some implementations.

FIG. 4 illustrates at 400 the robot 104 and several of the angles and lines used to describe the movement of the moveable component 138, according to some implementations. A maximum panning angle 402 is depicted that indicates the maximum rotation that is permitted to the moveable component 138 along the panning axis. For example, the maximum panning angle 402 may be the maximum rotation constrained by the mounting mechanism of the moveable component 138 to rotate left to right. Information about the maximum panning angle 402 may be stored as the maximum angle data 238.

Depicted is the chassis centerline 134, the moveable component centerline 140, and a target line 404. In the implementation depicted here, these lines may extend from a common origin point with respect to the robot 104. For example, the common origin point may be along the axis of rotation of the moveable component 138 with respect to the robot 104. The target line 404 extends from the origin point through the target point 132 that is along the planned path 126. The chassis centerline 134, moveable component centerline 140, target line 404, and so forth are shown by way of illustration and not necessarily as a limitation. For example, other reference lines with respect to the robot 104 or to an external reference or coordinate system may be used.

A relative bearing 406 is depicted. The relative bearing 406 comprises the angle between the chassis centerline 134 and the target line 404. A moveable component angle 408 is also depicted. The moveable component angle 408 comprises the angle between the chassis centerline 134 and the moveable component centerline 140. As illustrated here, the moveable component 138 is not oriented to the target point 132, as the moveable component angle 408 is not the same, or within a threshold value of, the relative bearing 406.

Figure 5:
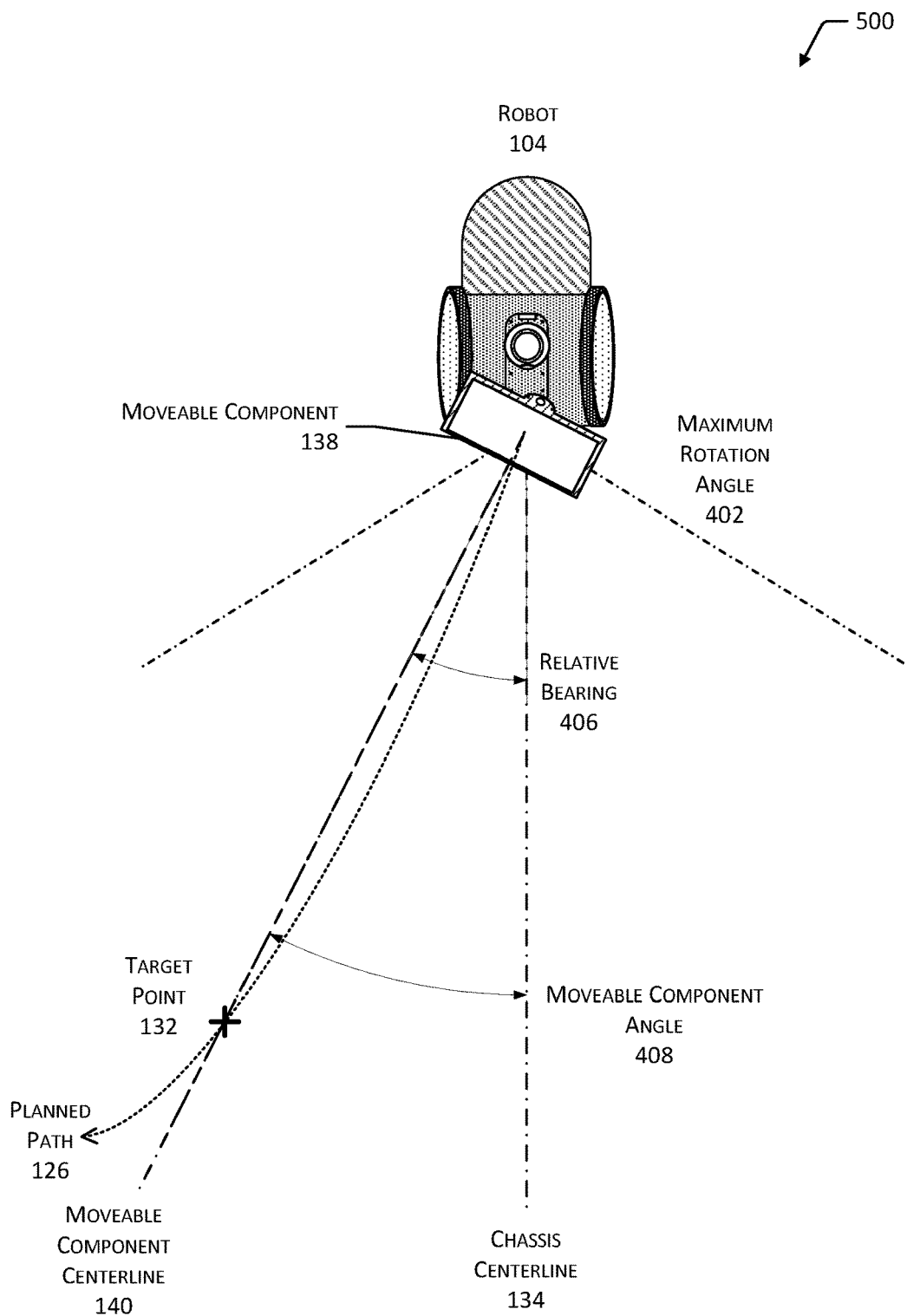
FIG. 5 illustrates the moveable component being oriented towards the target point, according to some implementations.

FIG. 5 illustrates at 500 the moveable component 138 being oriented towards the target point 132, according to some implementations. When oriented, the relative bearing 406 and the moveable component angle 408 are within a threshold value of one another. The moveable component centerline 140 is within a threshold distance of, or passes through, the target point 132.

Figure 6:
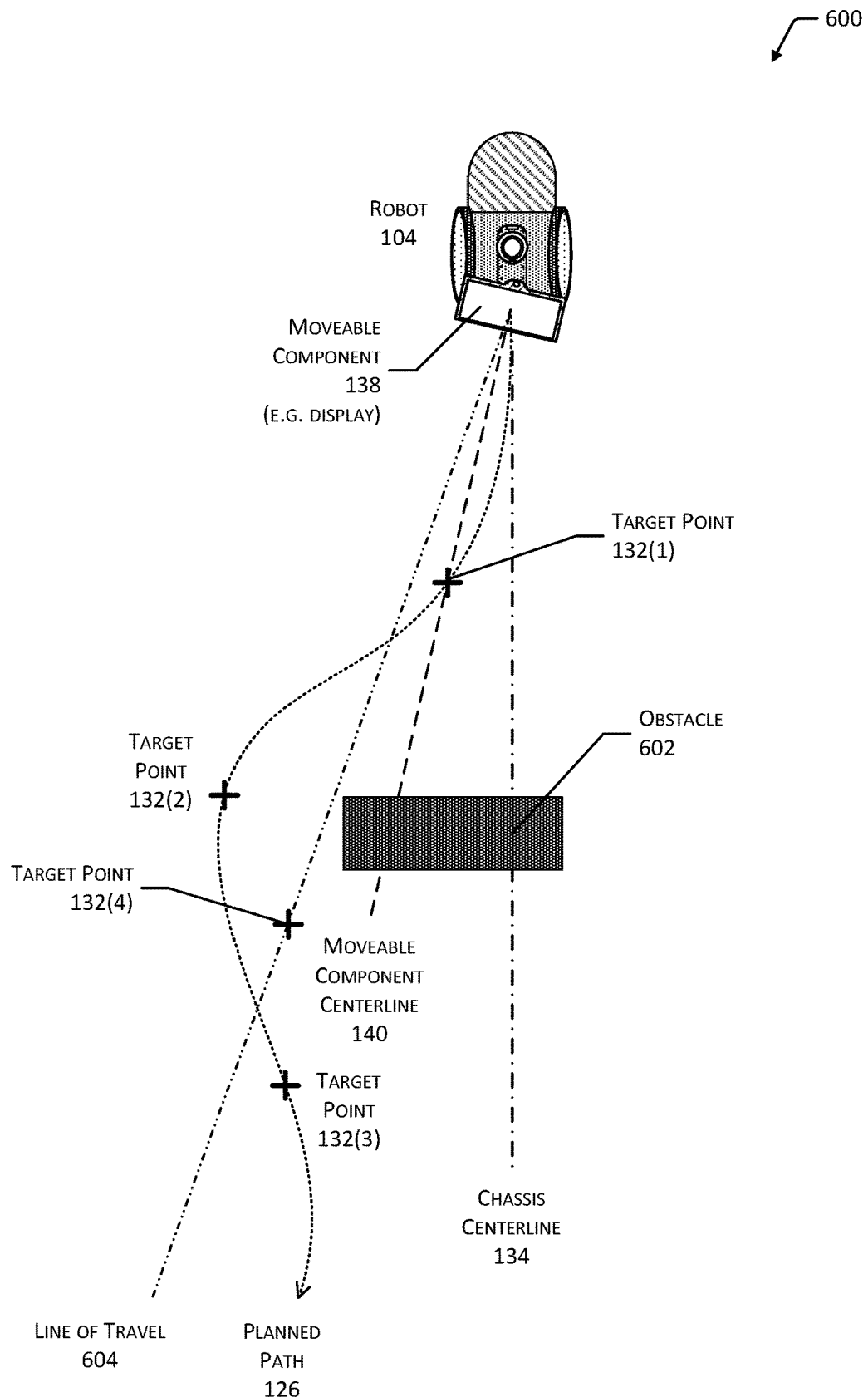
FIG. 6 illustrates target points on a planned path that pass around an obstacle, according to some implementations.

FIG. 6 illustrates at 600 target points 132(1)-(3) on a planned path 126 that passes around an obstacle 602, according to some implementations. The environment may contain obstacles 602 which the robot 104 avoids and passes around. As a result, the planned path 126 may include several turns or curves. As described above, the dynamic orientation module 128 may determine target point data 130 indicative of target points 132 based on a time interval, such as where the robot 104 is expected to be in a specified time interval, based on distance such as a distance along the planned path 126, and so forth. In some situations, this could place the target point 132 at a location that is outside of the line of sight of the robot 104. For example, as depicted here, the obstacle 602 is located between target point 132(3) and the robot 104. In some implementations, it may be desired to have the robot 104 instead orient the moveable component 138 to target points 132 that are within the line of sight of the robot 104, such as target points 132(1) or 132(2). This may provide more effective cueing to the user 102 as to the intended path, in effect providing information to the user 102 or other bystanders that the robot 104 is aware of the obstacle 602 and does not intend to try and pass through it.

In some implementations, the planned path 126 may be analyzed to determine if there are any turns, and if those turns exceed a threshold value. For example, the threshold value may comprise a turn that changes the heading of the robot 104 by more than 20 degrees. The dynamic orientation module 128 may select points associated with the turn, such as at a beginning, midpoint, end, and so forth.

In another implementation, the target point 132 which the moveable component 138 is oriented to may be determined from a plurality of intermediate points. For example, a plurality of intermediate points along at least a portion of the planned path 126 may be determined. A line of travel 604 may be determined based on the plurality of intermediate points. For example, a linear regression may be applied to the plurality of intermediate points along the planned path 126. The line of travel 604 may comprise the line of that linear regression. A target point 132(4) may comprise a point along the line of travel 604 that is a specified distance from the robot 104. The orientation data 136 may be determined with respect to this target point 132(4).

Figure 7:
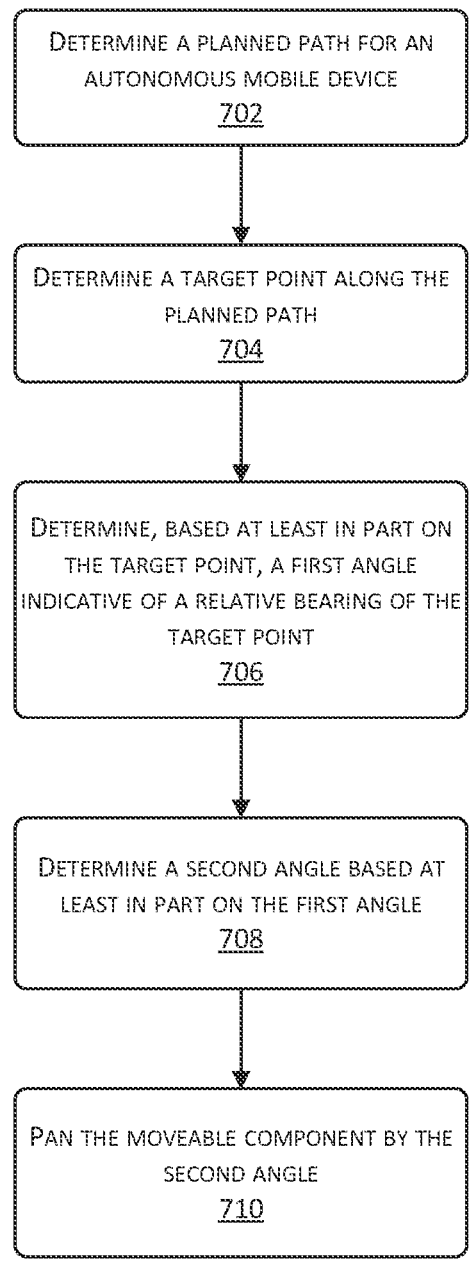
FIG. 7 is a flow diagram of a process to dynamically orient a moveable component, according to some implementations.

FIG. 7 is a flow diagram 700 of a process to dynamically orient a moveable component 138, according to some implementations. The process may be implemented at least in part by one or more of the processors 108 on the robot 104, the servers 148, the docking station 146, or other devices 150.

At 702, a planned path 126 is determined. For example, the path planning module 122 may be used to determine the planned path data 124 that is representative of a planned path 126 of the robot 104.

At 704 target point data 130 indicative of a target point 132 along the planned path 126 is determined. For example, the planned path data 124 may be processed to determine a location along the planned path 126 that the robot 104 is expected to be at in a specified interval of time.

At 706, based at least in part on the target point data 130, a relative bearing 406 is determined that is indicative of a first angle of the target point 132 with respect to the robot

104. For example, the relative bearing 406 may comprise an angle between the chassis centerline 134 and the target line 404.

At 708 a second angle is determined based at least in part on the first angle indicative of the relative bearing 406. For example, the second angle may comprise the moveable component angle 408 that the moveable component 138 is to be moved to. In some implementations the moveable component angle 408 may be the lesser of the relative bearing 406 or the maximum panning angle 402. For example, if the relative bearing 406 is +90 degrees and the maximum panning angle 402 is +45 degrees, the moveable component angle 408 would be +45 degrees, as this is the maximum the moveable component 138 is able to rotate. The second angle may be expressed as the orientation data 136.

At 710 one or more of the moveable component actuators 392 are operated to rotate the moveable component 138 with respect to the chassis by the second angle. For example, the orientation data 136 indicative of the second angle may be provided to the actuator controller 142. The actuator controller 142 may then generate signals to drive the moveable component actuators 392 to produce the desired panning of the moveable component 138.

Figure 8:
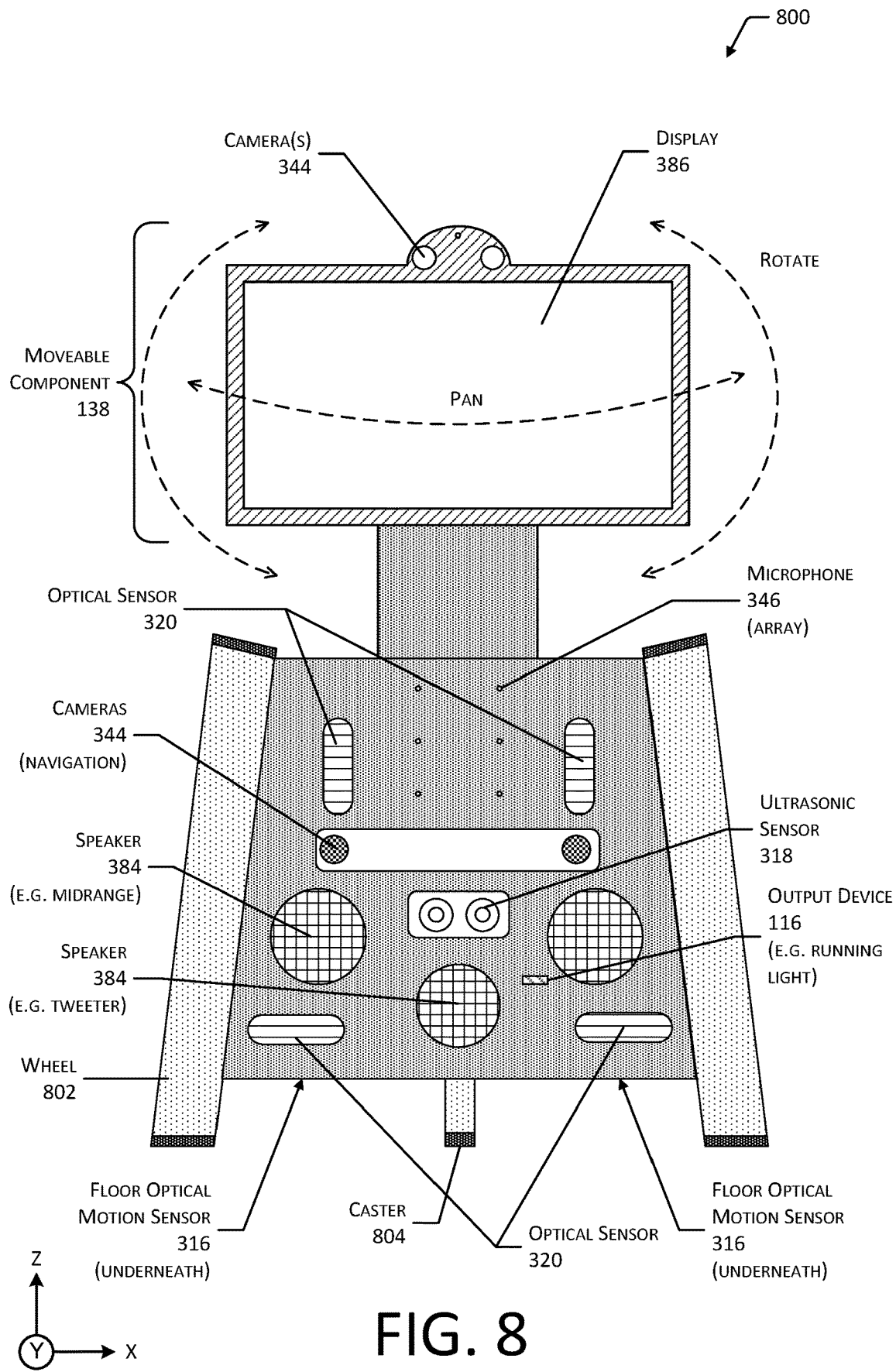
FIG. 8 is a front view of the robot, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 114. A first pair of optical sensors 320 are located along the lower edge of the front while a second pair of optical sensors 320 are located along an upper portion of the front. Between the second set of the optical sensors 320 is a microphone 346 (array).

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 110°. A relatively wide FOV allows for easier detection of moving objects, such as users 102 or pets that may be in the path of the robot 104. Also, the relatively wide FOV facilitates the robot 104 being able to detect objects when turning.

The sensor data 228 comprising images produced by this pair of cameras 344 can be used by the autonomous navigation module 220 for navigation of the robot 104. The cameras 344 used for navigation may be of different resolution from, or sensitive to different wavelengths than, cameras 344 used for other purposes such as video communication. For example, the navigation cameras 344 may be sensitive to infrared light allowing the robot 104 to operate in darkness, while the camera 344 mounted above the display 386 may be sensitive to visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

In this illustration, the moveable component 138 comprises the display 386 and cameras 344 arranged above the display 386. The cameras 344 may operate to provide stereoimages of the physical environment, the user 102, and so forth. For example, an image from each of the cameras 344 above the display 386 may be accessed and used to generate stereo image data about a face of a user 102. This stereoimage data may then be used for facial recognition, user identification, gesture recognition, gaze tracking, and so forth. In other implementations, a single camera 344 may be present above the display 386.

As described earlier, the moveable component 138 is mounted on a movable mount that allows for movement with respect to the chassis of the robot 104. The movable mount may allow the moveable component 138 to be moved by the moveable component actuators 392 along one or more degrees of freedom. For example, the moveable component 138 may pan, tilt, and rotate as depicted here. The size of the moveable component 138 may vary. In one implementation, the display 386 in the moveable component 138 may be approximately 8 inches as measured diagonally from one corner to another.

An ultrasonic sensor 318 is also mounted on the front of the robot 104 and may be used to provide sensor data 228 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user 102, and so forth.

One or more bumper switches 314 (not shown) may be present along the front of the robot 104. For example, a portion of the housing of the robot 104 that is at the leading edge may be mechanically coupled to one or more bumper switches 314.

Other output devices 116, such as one or more lights 382, may be on an exterior of the robot 104. For example, a running light may be arranged on a front of the robot 104. The running light may provide light for operation of one or more of the cameras 344, a visible indicator to the user 102 that the robot 104 is in operation, and so forth.

One or more of the FOMS 316 are located on an underside of the robot 104.

Figure 9:
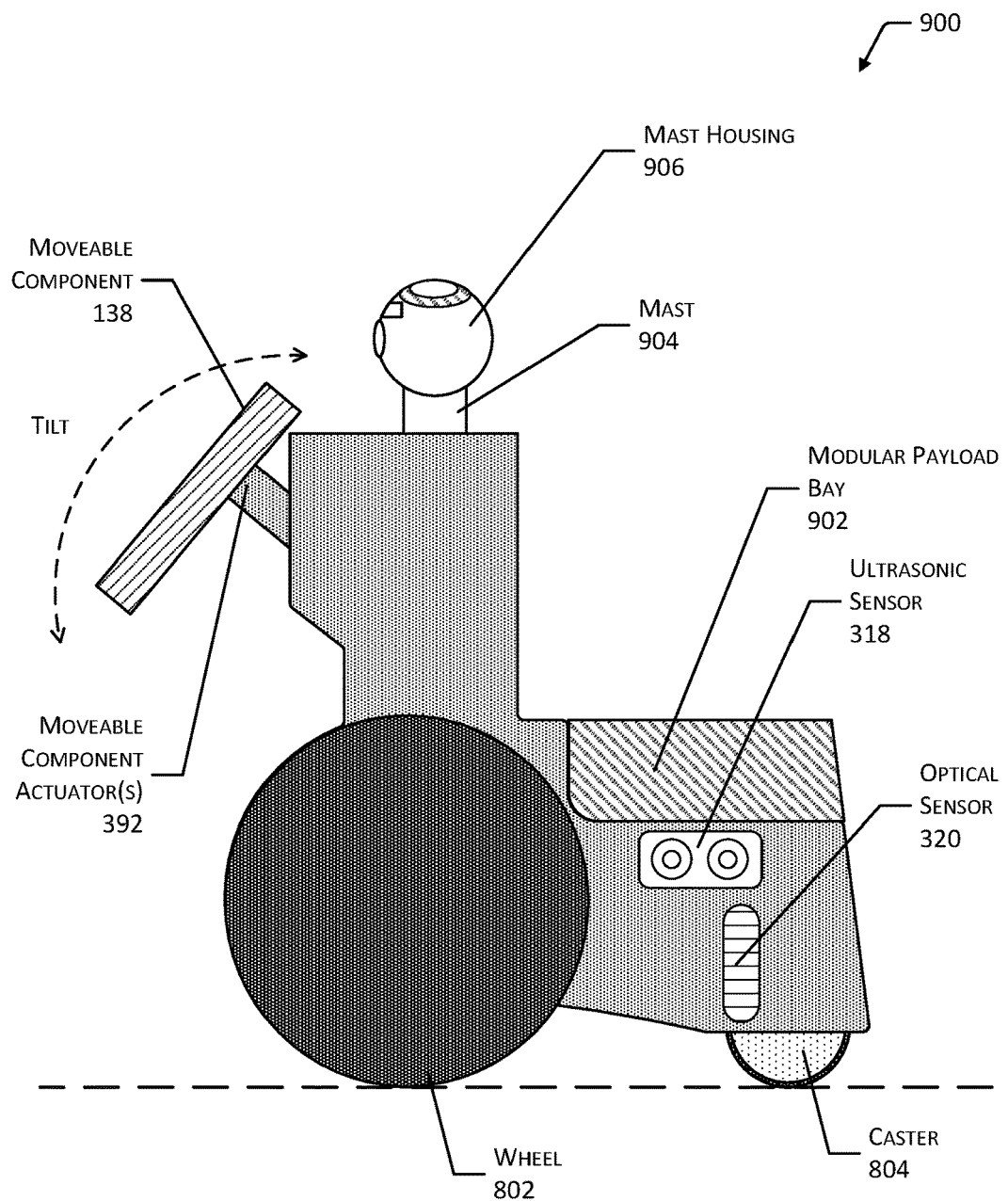
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user 102 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing of the robot 104 may comprise a shape-memory polymer that upon impact deforms but then over time returns to the original shape.

In this side view, the left side of the robot 104 is depicted. An ultrasonic sensor 318 and an optical sensor 320 are present on either side of the robot 104.

In this illustration, the caster 804 is shown in a trailing configuration, in which the caster 804 is located behind or aft of the axle of the wheels 802. In another implementation (not shown) the caster 804 may be in front of the axle of the wheels 802. For example, the caster 804 may be a leading caster 804 positioned forward of the axle of the wheels 802.

The robot 104 may include a modular payload bay 902 located within the lower structure. The modular payload bay 902 provides one or more of mechanical or electrical connectivity with robot 104. For example, the modular payload bay 902 may include one or more engagement features such as slots, cams, ridges, magnets, bolts, and so forth that are used to mechanically secure an accessory within the modular payload bay 902. In one implementation, the modular payload bay 902 may comprise walls within which the accessory may sit. In another implementation, the modular payload bay 902 may include other mechanical engagement features such as slots into which the accessory may be slid and engaged.

The modular payload bay 902 may include one or more electrical connections. For example, the electrical connections may comprise a universal serial bus (USB) connection that allows for the transfer of data, electrical power, and so forth between the robot 104 and the accessory.

As described above, the robot 104 may incorporate a moveable component 138 that includes a display 386 which may be utilized to present visual information to the user 102. In some implementations, the moveable component 138 may be located with or affixed to the upper structure. In some implementations, the display 386 may comprise a touch screen that allows user input to be acquired. The moveable component 138 is mounted on a movable mount that allows motion along one or more axes. For example, the movable mount may allow the moveable component 138 to be panned, tilted, and rotated by the moveable component actuators 392. The moveable component 138 may be moved to provide a desired viewing angle to the user 102, to provide output from the robot 104, and so forth. For example, the output may comprise the moveable component 138 being tilted forward and backward to provide a gestural output equivalent to a human nodding their head, or panning to face the target point 132 as described above.

The robot 104 may incorporate a mast 904. The mast 904 provides a location from which additional sensors 114 or output devices 116 may be placed at a higher vantage point. The mast 904 may be fixed or extensible. The extensible mast 904 is depicted in this illustration. The extensible mast 904 may be transitioned between a retracted state, an extended state, or placed at some intermediate value between the two.

At the top of the mast 904 may be a mast housing 906. In this illustration, the mast housing 906 is approximately spherical, however in other implementations other physical form factors such as cylinders, squares, or other shapes may be utilized.

The mast housing 906 may contain one or more sensors 114. For example, the sensors 114 may include a camera 344 having a field-of-view (FOV). In another example, the sensors 114 may include an optical sensor 320 to determine a distance to an object. The optical sensor 320 may look upward, and may provide information as to whether there is sufficient clearance above the robot 104 to deploy the mast 904. In another example, the mast housing 906 may include one or more microphones 346.

One or more output devices 116 may also be contained by the mast housing 906. For example, the output devices 116 may include a camera flash used to provide illumination for the camera 344, an indicator light that provides information indicative of a particular operation of the robot 104, and so forth.

Other output devices 116, such as one or more lights 382, may be elsewhere on an exterior of the robot 104. For example, a light 382 may be arranged on a side of the upper structure.

In some implementations, one or more of the sensors 114, output devices 116, or the mast housing 906 may be movable. For example, the motor 380 may allow for the mast 904, the mast housing 906, or a combination thereof to be panned allowing the FOV to move from left to right.

In some implementations, the moveable component 138 may be mounted to the mast 904. For example, the moveable component 138 may be affixed to the mast housing 906. In another example, the moveable component 138 may be mounted to a portion of the mast 904, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
 a chassis;
 a display device attached to the chassis, wherein the display device has a center point located midway between a left edge and a right edge of the display device;
 one or more actuators to pan the display device from a first angle to a second angle with respect to the chassis;
 one or more motors coupled to one or more wheels;
 a battery;
 a clock; and
 one or more processors to execute instructions to:
  determine trajectory data indicative of a planned path of the robot, wherein the planned path extends from a first location to a second location;
  operate, based on the trajectory data, the one or more motors to move the robot;
  determine a current time using the clock;
  determine a target point along the planned path, wherein the target point corresponds to a location along the planned path where the robot is expected to be at a first time interval from the current time;
  determine a first relative bearing to the target point, wherein the first relative bearing comprises a third angle between a heading of the robot that extends along a centerline of the chassis and the target point; and
  operate the one or more actuators to pan the display device such that a line extending from a center point of the display device to the target point is perpendicular to a surface of the display device.

2. The robot of claim 1, the one or more processors to execute instructions to:
 determine, based on the trajectory data, a predicted velocity of the robot along at least a portion of the planned path;
 determine a tilt angle based on the predicted velocity; and
 operate the one or more actuators to tilt the display device by the tilt angle.

3. The robot of claim 1, the one or more processors to execute instructions to:
 determine, based on the trajectory data, a radius of curvature of at least a portion of the planned path;
 determine a rotation angle based on the radius of curvature; and
 operate the one or more actuators to rotate the display device by the rotation angle, wherein the rotation of the display device is along an axis that is perpendicular to a plane of the display device.

4. An autonomous mobile device comprising:
 a chassis,
 a motor coupled to one or more wheels;
 a motor controller coupled to the motor;
 a moveable component;
 an actuator coupled to the moveable component; and
 an actuator controller that controls operation of the actuator, the actuator controller comprising one or more processors to execute instructions to:
  receive data indicative of a first planned path for the autonomous mobile device;
  determine a first point along the first planned path;
  determine, based at least in part on the first point, a first angle indicative of a relative bearing of the first point with respect to the autonomous mobile device;
  determine a second angle based at least in part on the first angle; and
  operate the actuator to pan the moveable component with respect to the chassis by the second angle.

5. The autonomous mobile device of claim 4, wherein the moveable component comprises one or more of:
 a display screen,
 a camera,
 a microphone, or
 a speaker.

6. The autonomous mobile device of claim 4, wherein the data indicative of the first planned path comprises one or more of:
 control instructions to the motor controller that specify one or more of:
  a rotation rate of the motor,
  a duration of rotation, or
  a total number of rotations of the motor;
 a vector indicative of a direction and a distance relative to the chassis;
 a waypoint; or
 a trajectory.

7. The autonomous mobile device of claim 4, wherein the second angle comprises a lesser of either the first angle or a maximum panning angle permitted by the actuator.

8. The autonomous mobile device of claim 4, wherein the first point corresponds to a location along the first planned path where the autonomous mobile device is expected to be at a first time interval from a current time.

9. The autonomous mobile device of claim 4, wherein the first point corresponds to a location that is a specified distance along the first planned path.

10. The autonomous mobile device of claim 4, wherein the first point corresponds to a location along the first planned path at which the first planned path transitions from having a first radius of curvature that is greater than a first threshold value to having a second radius of curvature that is less than a second threshold value.

11. The autonomous mobile device of claim 4, the one or more processors to execute instructions to:
 determine a predicted velocity along at least a portion of the first planned path;
 determine a third angle based on the predicted velocity; and
 operate the actuator to tilt the moveable component by the third angle.

12. The autonomous mobile device of claim 4, the one or more processors to execute instructions to:
 determine a radius of curvature of at least a portion of the first planned path;
 determine a third angle based on the radius of curvature; and
 operate the actuator to rotate the moveable component by the third angle, wherein the rotation of the moveable component is along an axis that is perpendicular to a plane of the moveable component.

13. A computer-implemented method comprising:
 determining, for an autonomous mobile device, a planned path of travel;
 moving the autonomous mobile device along the planned path;

determining, based on the planned path, a first point; and changing, based at least in part on the first point, an orientation of a moveable component of the autonomous mobile device with respect to a chassis of the autonomous mobile device without affecting movement along the planned path.

14. The computer-implemented method of claim 13, further comprising:

determining, based at least in part on a relative location of the first point with respect to the autonomous mobile device, a first angle indicative of a relative bearing of the first point with respect to the autonomous mobile device;

determining a second angle based at least in part on the first angle; and wherein the change in orientation comprises a rotation by the second angle.

15. The computer-implemented method of claim 14, further comprising:

determining a maximum panning angle of the moveable component with respect to the chassis of the autonomous mobile device; and wherein the second angle comprises a lesser of either the first angle or the maximum panning angle.

16. The computer-implemented method of claim 13, the determining the first point comprising calculating a location along the planned path where the autonomous mobile device is expected to be at a first time interval from a current time.

17. The computer-implemented method of claim 13, further comprising:

determining a location of an obstacle; and wherein the first point corresponds to a second location that is within a threshold distance of the planned path and is between the autonomous mobile device and the location of the obstacle.

18. The computer-implemented method of claim 13, wherein the first point corresponds to a location along the planned path at which the planned path transitions from having a first radius of curvature that is greater than a first threshold value to having a second radius of curvature that is less than a second threshold value.

19. The computer-implemented method of claim 13, further comprising:

determining a predicted velocity along at least a portion of the planned path of travel;

determining a first angle based on the predicted velocity; and changing, based on the first angle, a tilt of the moveable component with respect to the chassis of the autonomous mobile device.

20. The computer-implemented method of claim 13, further comprising:

determining a radius of curvature of at least a portion of the planned path of travel;

determining a first angle based on the radius of curvature; and changing, based on the first angle, a rotation of the moveable component with respect to the chassis of the autonomous mobile device.

* * * * *

UNITED STATES PATENT AND TRADEMARK OFFICE
CERTIFICATE OF CORRECTION

PATENT NO. : 11,372,408 B1
APPLICATION NO. : 16/058100
DATED : June 28, 2022
INVENTOR(S) : Webster et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 285 days.

Signed and Sealed this
Twenty-second Day of November, 2022

*Katherine Kelly Vidal*

Katherine Kelly Vidal
*Director of the United States Patent and Trademark Office*